F. G. WACKER.
METALLIC RECEPTACLE AND METHOD OF WELDING THE SAME.
APPLICATION FILED JULY 26, 1916.
1,222,165.                                           Patented Apr. 10, 1917.
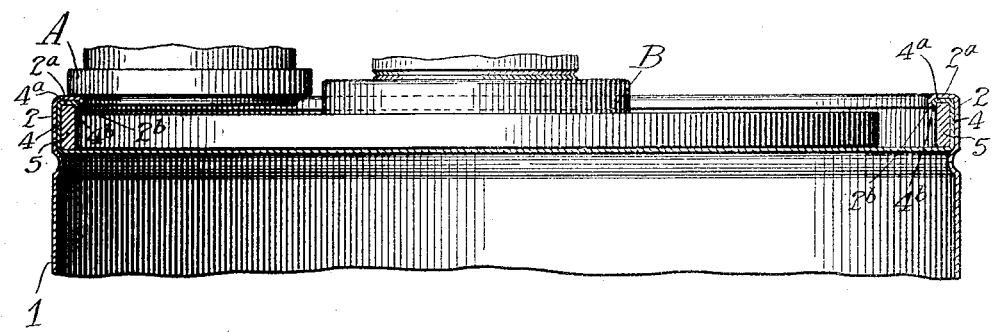
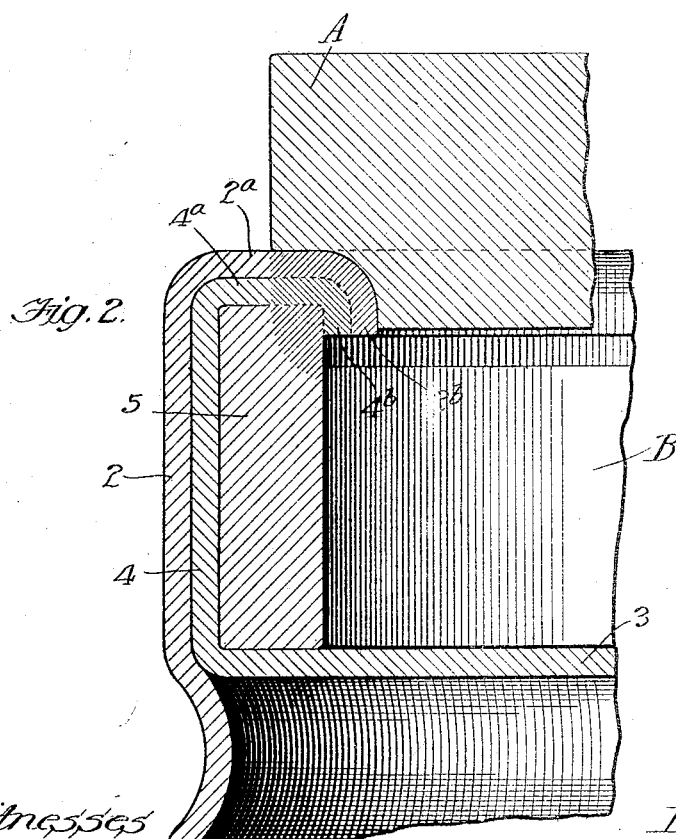

UNITED STATES PATENT OFFICE.

FREDERICK G. WACKER, OF CHICAGO, ILLINOIS, ASSIGNOR TO CHARLES H. WACKER, OF CHICAGO, ILLINOIS.

METALLIC RECEPTACLE AND METHOD OF WELDING THE SAME.

1,222,165. Specification of Letters Patent. Patented Apr. 10, 1917.

Application filed July 26, 1916. Serial No. 111,355.

*To all whom it may concern:*

Be it known that I, FREDERICK G. WACKER, a citizen of the United States, residing at Chicago, Cook county, Illinois, have invented certain new and useful Improvements in Metallic Receptacles and Methods of Welding the Same, of which the following is a specification.

My invention relates to improvements in metallic receptacles such as barrels, casks, drums and the like, and the object thereof is to provide a simple and efficient closure for one or both ends of such a receptacle.

My invention relates more particularly to the chime construction and consists in a certain structure and welding, as well as a new method of welding the same, with the result that the different parts constituting the chime will be securely and effectually welded together and the proper tightness and sealing thereby assured.

In the drawings Figure 1 represents a vertical section of one end of a barrel embodying my construction and showing in elevation the electric welding rolls or tools, and Fig. 2 an enlarged sectional detail of the chime construction and a portion of one of the welding rolls.

Referring to the particular embodiment of my invention as herein shown, the barrel body 1 is provided with a rim 2. The closure or head 3 is provided with a right-angled outwardly extending rim 4 which fits within the rim 2. The reinforcing chime ring or hoop 5, which is preferably rectangular in cross section, fits within the rim 4. The head rim 4 is double flanged at its outer portion, the innermost flange $4^a$ fitting over the top of the ring 5 and the outermost flange $4^b$ extending partially over the inner side of such ring. The rim 2 is provided with similar flanges $2^a$ and $2^b$ fitting over the flanges $4^a$ and $4^b$ respectively.

By the construction described there is provided a considerable body or mass of metal at the places where the parts are to be welded, that is the flanges $2^a$ and $2^b$ and the flanges $4^a$ and $4^b$ and also the upper portion of the ring.

The welding is done by an electric welder such as shown in the drawing wherein I have illustrated a portion of the welding mechanism comprising an electric roll A which is grooved to conform with the said flanges, as shown in Fig. 2, and also a roll B which is adapted to bear against the chime structure, in the present instance against the inner surface of the ring 5, such roll constituting a part of the electrical circuit. The arrangement of these rolls is such that the current passes through the rolls and through the large mass or body of metal described, with the result that the parts will be welded as shown by the darkened lines at the upper end of the ring 5 and the adjacent flanges. By thus providing the flanges described and thereby a considerable mass of metal, including a portion of the ring 5, there is no danger of rapid radiation or conduction of the heat and consequent straining and distorting of the parts which in cooling would be liable to prevent tight joints. Consequently according to my construction the large mass described will be welded together and by reason of the size of the mass or body the cooling will not be rapid but will be rather gradual, therefore there would be no possibility of any straining or distorting of the parts or any possibility of opening up of any of the joints. Moreover, the welding is done in constant continuous manner and in the circular direction of the flanges.

I claim:

1. A barrel chime construction comprising a barrel body having a rim, a closure or head having a rim fitting within the body rim, a chime ring fitting within the head rim, the latter rim being double flanged with the innermost flange fitting over the top of the chime ring and the outermost flange fitting partly over the inner side thereof, and the body rim being similarly double flanged to fit over the flanges of the head rim, the said outermost flanges and a portion of said innermost flanges of the two rims being electrically welded together by current passed through said flanges, whereby the flanges are brought to a welding heat by resistance.

2. A barrel chime construction comprising a barrel body having a rim, a closure or head having a rim fitting within the body rim, a chime ring fitting within the head rim, the latter rim being double flanged with the innermost flange fitting over the top of the chime ring and the outermost flange fitting partly over the inner side thereof, and the body rim being similarly double flanged to fit over the flanges of the head rim, the outermost flanges and a portion of the innermost flanges of the two rims together with the upper inner edge of the chime ring being electrically welded together by current passed through said flanges and the ring, whereby said parts are brought to a welding heat by resistance.

3. The method of electrically welding a chime structure which includes coöperating body and head flanges, said method consisting of applying to such flanges an electric roll having a portion fitting upon and corresponding to the shape of said flanges and applying a second roll to said structure, thereby causing a continuous and successive welding of the flanges in a circular direction.

4. The method of electrically welding a chime structure which includes coöperating body and head flanges, and also includes a reinforcing ring over which said flanges extend, said method consisting of applying to such flanges an electric roll having a portion fitting upon and corresponding to the shape of said flanges, and also applying a second electric roll to said ring, thereby causing a continuous successive welding of the flanges in a circular direction.

5. The method of electrically welding a chime structure which includes coöperating body and head flanges, said method consisting in applying to such flanges with pressure an electric welding tool having a portion corresponding to the final shape of such flanges thereby simultaneously welding and shaping such flanges.

FREDERICK G. WACKER.

Witnesses:
S. E. HIBBEN,
ROBERT DOBBERMAN.

Copies of this patent may be obtained for five cents each, by addressing the "Commissioner of Patents, Washington, D. C."